United States Patent
Cleary et al.

(10) Patent No.: US 8,061,318 B2
(45) Date of Patent: Nov. 22, 2011

(54) METHOD AND APPARATUS FOR CONTINUOUSLY VARIABLE DIFFERENTIAL PHASING OF ENGINE VALVE OPERATION

(75) Inventors: David J. Cleary, Shanghai (CN); Paul M. Najt, Bloomfield Hills, MI (US); Craig D. Marriott, Clawson, MI (US); Junseok Chang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 420 days.

(21) Appl. No.: 12/237,471

(22) Filed: Sep. 25, 2008

(65) Prior Publication Data
US 2009/0084333 A1 Apr. 2, 2009

Related U.S. Application Data

(60) Provisional application No. 60/975,586, filed on Sep. 27, 2007.

(51) Int. Cl.
*F01L 1/34* (2006.01)
(52) U.S. Cl. .............. 123/90.17; 123/90.15; 123/90.31
(58) Field of Classification Search ............. 123/90.15, 123/90.17, 90.31
See application file for complete search history.

(56) References Cited

U.S. PATENT DOCUMENTS

| | | | |
|---|---|---|---|
| 5,417,186 A * | 5/1995 | Elrod et al. | 123/90.17 |
| 6,397,800 B2 * | 6/2002 | Nohara et al. | 123/90.15 |
| 6,405,693 B2 | 6/2002 | Yoeda et al. | |
| 6,655,329 B2 | 12/2003 | Kammerdiener et al. | |
| 6,886,533 B2 | 5/2005 | Leiby et al. | |
| 7,017,539 B2 | 3/2006 | Lewis et al. | |
| 7,021,277 B2 | 4/2006 | Kuo et al. | |
| 7,069,892 B2 | 7/2006 | Lechner et al. | |
| 7,079,935 B2 | 7/2006 | Lewis et al. | |
| 7,252,061 B2 | 8/2007 | Lucatello | |
| 7,278,383 B2 | 10/2007 | Kamiyama et al. | |
| 7,280,909 B2 | 10/2007 | Lewis et al. | |
| 7,383,820 B2 | 6/2008 | Lewis et al. | |
| 2005/0183693 A1 * | 8/2005 | Yang et al. | 123/305 |
| 2007/0272183 A1 | 11/2007 | Schneider | |

* cited by examiner

*Primary Examiner* — Zelalem Eshete

(57) ABSTRACT

An internal combustion engine includes a crankshaft and first and second cam actuated intake valves. A method for operating the engine includes providing a first intake cam configured to actuate the first cam actuated intake valve, and providing a second intake cam configured to actuate the second cam actuated intake valve. The second intake cam is phase adjustable relative to the crankshaft independently of the phase of the first intake cam relative to the crankshaft. A controller is provided and configured to selectively retard the phase of the second intake cam to effect later closing of the second cam actuated intake valve sufficiently to reduce the effective compression ratio of the engine. Additionally, the first intake cam may be phase adjustable relative to the crankshaft independently of the phase of the second intake cam relative to the crankshaft and the controller may additionally be configured to selectively advance the phase of the first intake cam to effect earlier opening of the first cam actuated intake valve sufficiently to increase internal exhaust gas recirculation.

15 Claims, 8 Drawing Sheets

METHOD AND APPARATUS FOR CONTINUOUSLY VARIABLE DIFFERENTIAL PHASING OF ENGINE VALVE OPERATION

CROSS REFERENCE TO RELATED APPLICATIONS

This application claims the benefit of U.S. Provisional Application No. 60/975,586 filed on Sep. 27, 2007 which is hereby incorporated herein by reference.

TECHNICAL FIELD

This invention relates to control of engine valves for internal combustion engines.

BACKGROUND

The statements in this section merely provide background information related to the present disclosure and may not constitute prior art.

Internal combustion engines, especially automotive internal combustion engines, generally fall into one of two categories, spark ignition engines and compression ignition engines. Known spark ignition engines, such as gasoline engines, function by introducing a fuel/air mixture into the combustion cylinders, which is then compressed in the compression stroke and ignited by a spark plug. Known compression ignition engines, such as diesel engines, function by introducing or injecting pressurized fuel into a combustion cylinder near top dead center (TDC) of the compression stroke, which ignites upon injection. Combustion in both known gasoline and diesel engines involves premixed or diffusion flames that are controlled by fluid mechanics.

Known gasoline engine systems are throttled at light-load and part-load operating conditions to limit the inducted trapped air mass into the engine as a means of controlling the engine load. This throttled engine operation results in high pumping work that limits the fuel economy potential of the gasoline engine.

Known variable-valve actuation (VVA) systems may reduce pumping losses by operating the engine in regimes that reduce the effective displacement of the engine. Known operating systems include Early-Intake Valve-Closing (EIVC) and Late-Intake-Valve-Closing (LIVC) VVA strategies. Known LIVC systems can have limited benefits when using a discrete two position switching mechanism and lack of continuous cam phasing.

Cam phasing is known whereby intake camshafts, exhaust camshafts or both intake and exhaust camshafts are continuously adjustable within limits to effect controlled phasing of all of the respective intake and exhaust valves actuated by the respective camshaft.

Fully flexible variable valve actuation is known whereby timing, duration and lift of individual valves are controlled via various implementations including electronically, hydraulically and combinations thereof.

One known diesel engine includes a single overhead camshaft carrying intake cams for intake valve actuations and exhaust cams for exhaust valve actuations. The camshaft includes concentric inner and outer shafts. One of the intake and exhaust cams are rotationally fixed to the inner shaft and the other of the intake and exhaust cams are rotationally fixed to the outer shaft. Relative phasing of the intake and exhaust cams can thereby be adjusted whereby relative phase control of the intake and exhaust valves serviced by a single camshaft can be adjusted. However, all intake valves are commonly phased and all exhaust valves are commonly phased.

SUMMARY

An internal combustion engine includes a crankshaft and first and second cam actuated intake valves. A method for operating the engine includes providing a first intake cam configured to actuate the first cam actuated intake valve, and providing a second intake cam configured to actuate the second cam actuated intake valve. The second intake cam is phase adjustable relative to the crankshaft independently of the phase of the first intake cam relative to the crankshaft. A controller is provided and configured to selectively retard the phase of the second intake cam to effect later closing of the second cam actuated intake valve sufficiently to reduce the effective compression ratio of the engine.

BRIEF DESCRIPTION OF THE DRAWINGS

One or more embodiments will now be described, by way of example, with reference to the accompanying drawings, in which.

DETAILED DESCRIPTION

Figure 1:
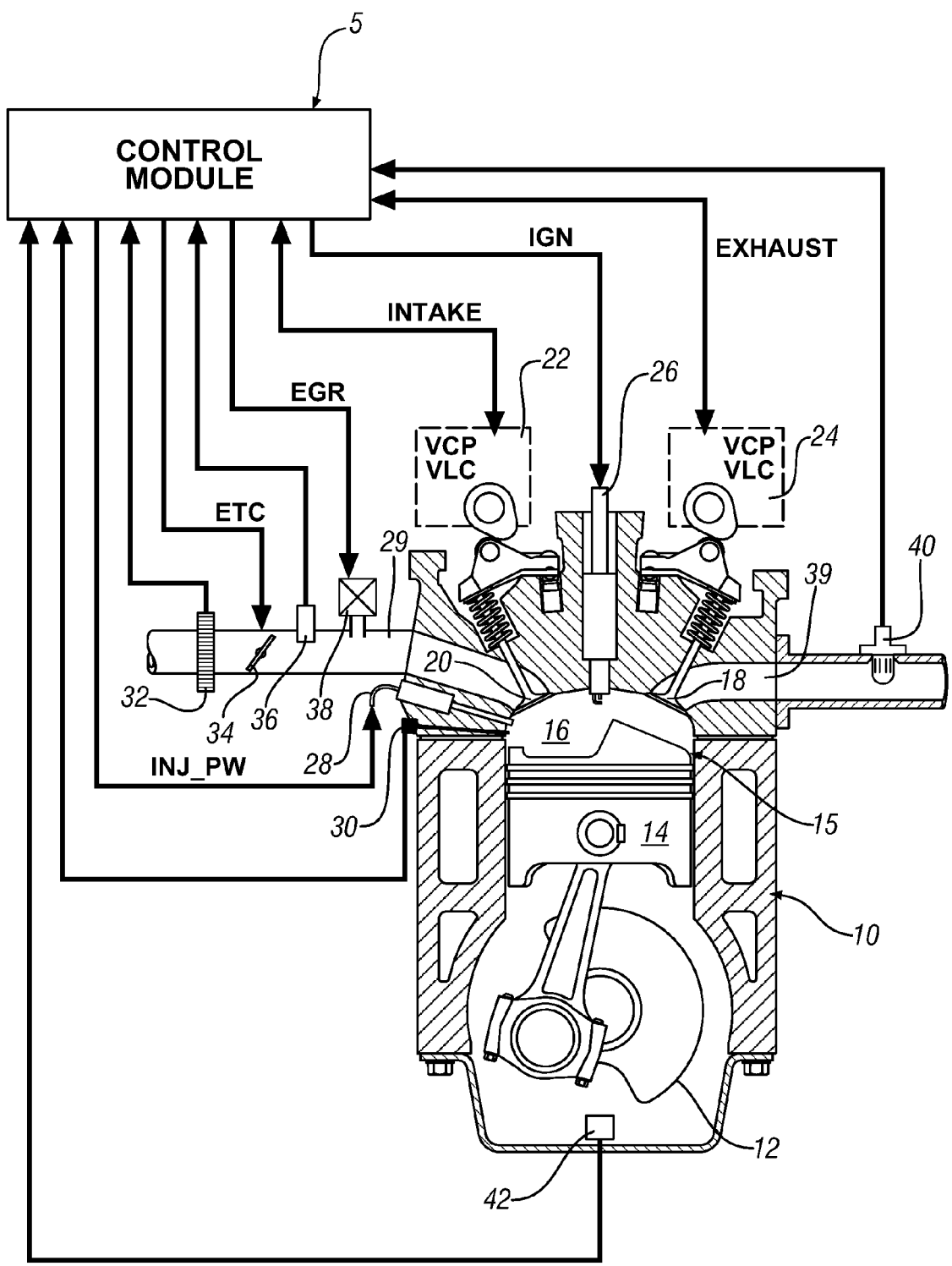
FIG. 1 is a partial sectional schematic drawing of an exemplary dual overhead camshaft engine system in accordance with the present disclosure.

Referring now to the drawings, wherein the depictions are for the purpose of illustrating certain exemplary embodiments only and not for the purpose of limiting the same, FIG. 1 schematically shows an internal combustion engine 10 and accompanying control module 5. The engine 10 is selectively operative in a controlled auto-ignition combustion mode, a homogeneous spark-ignition combustion mode, and a stratified-charge spark-ignition combustion mode.

The exemplary engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which their linear reciprocating motion is translated to rotational motion. An air intake system provides intake air to an intake manifold 29 which directs and distributes air into an intake runner to each combustion chamber 16. The air intake system comprises airflow ductwork and devices for monitoring and controlling the air flow. The air intake devices preferably include a mass airflow sensor 32 for monitoring mass airflow and intake air temperature. A throttle valve 34 preferably comprises an electronically controlled device which controls air flow to the engine 10 in response to a control signal ('ETC') from the control module 5. A pressure sensor 36 in the manifold is adapted to monitor manifold absolute pressure and barometric pressure. An external flow passage recirculates exhaust gases from engine exhaust to the intake manifold, having a flow control valve, referred to as an exhaust gas recirculation ('EGR') valve 38. The control module 5 is operative to control mass flow of exhaust gas to the intake manifold 29 by controlling opening of the EGR valve 38.

Air flow from the intake manifold 29 into each of the combustion chambers 16 is controlled by one or more intake valves 20. Flow of combusted gases from each of the combustion chambers 16 to an exhaust manifold 39 is controlled by one or more exhaust valves 18. Openings and closings of the intake and exhaust valves 20 and 18 are preferably controlled with a dual camshaft (as depicted), the rotations of which are linked and indexed with rotation of the crankshaft 12. The engine 10 is equipped with devices for controlling valve lift of the intake valves and the exhaust valves, referred to as variable lift control (hereafter 'VLC') devices. The variable lift control devices in this embodiment are operative to control valve lift, or opening, to one of two distinct steps, e.g., a low-lift valve opening (about 4-6 mm) for low speed, low load engine operation, and a high-lift valve opening (about 8-10 mm) for high speed, high load engine operation. The engine is further equipped with devices for controlling phasing (i.e., relative timing) of opening and closing of the intake and exhaust valves 20 and 18, referred to as variable cam phasing ('VCP'), to control phasing beyond that which is effected by the two-step VLC lift. There is a VCP/VLC system 22 for the intake valves 20 and a VCP/VLC system 24 for the engine exhaust valves 18. The VCP/VLC systems 22 and 24 are controlled by the control module 5, and provide signal feedback to the control module 5, for example through camshaft rotation position sensors for the intake camshaft and the exhaust camshaft. When the engine 10 is operating in the HCCI combustion mode with an exhaust recompression valve strategy, the VCP/VLC systems 22 and 24 are preferably controlled to the low lift valve openings. When the engine is operating in the homogeneous spark-ignition combustion mode, the VCP/VLC systems 22 and 24 are preferably controlled to the high lift valve openings to minimize pumping losses. When operating in the HCCI combustion mode, low lift valve openings and negative valve overlap can be commanded to generate reformates in the combustion chamber 16. There can be a time lag between a command to change cam phasing and/or valve lift of one of the VCP/VLC systems 22 and 24 and execution of the transition due to physical and mechanical properties of the systems.

The intake and exhaust VCP/VLC systems 22 and 24 have limited ranges of authority over which opening and closing of the intake and exhaust valves 18 and 20 can be controlled. VCP systems can have a range of phasing authority of about 60°-90° of cam shaft rotation, thus permitting the control module 5 to advance or retard valve opening and closing. The range of phasing authority is defined and limited by the hardware of the VCP and the control system which actuates the VCP. The intake and exhaust VCP/VLC systems 22 and 24 may be actuated using one of electro-hydraulic, hydraulic, and electric control force, controlled by the control module 5. Valve overlap of the intake and exhaust valves 20 and 18 refers to a period defining closing of the exhaust valve 18 relative to an opening of the intake valve 20 for a cylinder. The valve overlap can be measured in crank angle degrees, wherein a positive valve overlap (hereafter 'PVO') refers to a period wherein both the exhaust valve 18 and the intake valve 20 are open and a negative valve overlap (hereafter 'NVO') refers to a period between closing of the exhaust valve 18 and subsequent opening of the intake valve 20 wherein both the intake valve 20 and the exhaust valve 18 are closed. When operating in the HCCI combustion mode, the intake and exhaust valves may have a NVO as part of an exhaust recompression strategy. In a SI-Homogeneous combustion mode there is typically PVO.

The engine 10 includes a fuel injection system, comprising a plurality of high-pressure fuel injectors 28 each adapted to directly inject a mass of fuel into one of the combustion chambers 16, in response to a signal ('INJ_PW') from the control module 5. The fuel injectors 28 are supplied pressurized fuel from a fuel distribution system.

The engine 10 includes a spark-ignition system by which spark energy is provided to a spark plug 26 for igniting or assisting in igniting cylinder charges in each of the combustion chambers 16 in response to a signal ('IGN') from the control module 5. The spark plug 26 enhances the ignition timing control of the engine at certain conditions (e.g., during cold start and near a low load operation limit).

The engine 10 is equipped with various sensing devices for monitoring engine operation, including monitoring crankshaft rotational position, i.e., crank angle and speed. Sensing devices include a crankshaft rotational speed sensor ('crank sensor') 42, a combustionسsensor 30 adapted to monitor combustion and an exhaust gas sensor 40 adapted to monitor exhaust gases, for example using an air/fuel ratio sensor. The combustion sensor 30 comprises a sensor device operative to monitor a state of a combustion parameter and is depicted as a cylinder pressure sensor operative to monitor in-cylinder combustion pressure. The outputs of the combustion sensor 30, the exhaust gas sensor 40 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure ('IMEP') for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

The engine 10 is designed to operate un-throttled on gasoline or similar fuel blends in the controlled auto-ignition combustion mode over an extended area of engine speeds and loads. However, spark-ignition and throttle-controlled operation may be utilized under conditions not conducive to the controlled auto-ignition combustion mode and to obtain maximum engine power to meet an operator torque request with engine power defined by the engine speed and load. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used.

The control module 5 executes algorithmic code stored therein to control the aforementioned actuators to control engine operation, including throttle position, spark timing, fuel injection mass and timing, intake and/or exhaust valve timing and phasing, and EGR valve position to control flow of recirculated exhaust gases. Valve timing and phasing can include predetermined valve overlap, including NVO and low lift of the intake and exhaust valves 20 and 18 in an exhaust re-breathing strategy. The control module 5 is adapted to receive input signals from an operator, e.g., from a throttle pedal position and a brake pedal position, to determine an operator torque request, and from the sensors indicating the engine speed, intake air temperature, coolant temperature, and other ambient conditions.

The control module 5 is preferably a general-purpose digital computer generally comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. The control module has a set of control algorithms, comprising resident program instructions and calibrations stored in the non-volatile memory. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event, such as a specific crank angle location.

Referring now to the schematic illustrations of FIGS. 2-13, a single cylinder of a dual overhead camshaft internal combustion engine constructed in accordance with various embodiment of the invention is illustrated. Other cylinders of the engine are similarly configured as described. Reference numerals that are common with those appearing among the various FIGS. 1-13 correspond to like elements. Air flow from the engine intake into each combustion chamber is controlled in the present embodiment by two or more intake valves, minimally illustrated for simplicity with two intake valves 20A and 20B. However, more than two intake valves may be employed in other embodiments. Flow of combusted gases from each combustion chamber to an exhaust system is controlled in the present embodiment by two or more exhaust valves, minimally illustrated for simplicity with two exhaust valves 18A and 18B. However, more than two exhaust valves may be employed in other embodiments.

In the embodiments illustrated in FIGS. 2-13, the left portions of the figures correspond to exemplary intake valvetrains whereas the right portion of the figures correspond to exemplary exhaust valvetrains. Openings and closings of first and second intake valve 20A and 20B are controlled by respective first and second intake cams. Similarly, openings and closings of first and second exhaust valves 18A and 18B are controlled by respective first and second exhaust cams. Thus, in the exemplary dual overhead camshaft engine, there are first and second intake valves for each cylinder and corresponding first and second intake cams for each cylinder. All of the intake cams reside on a single intake camshaft for each bank of cylinders. Similarly, there are first and second exhaust valves for each cylinder and corresponding first and second exhaust cams for each cylinder. All of the exhaust cams reside on a single exhaust camshaft for each bank of cylinders.

In accordance with this disclosure, a dual overhead camshaft internal combustion engine includes an intake camshaft carrying intake cam lobes, and an exhaust camshaft carrying exhaust cam lobes. At least one of the intake and exhaust camshafts is a dual-concentric camshaft including an inner shaft and an outer shaft. Inner and outer shafts are configured concentrically and capable, within limits, of relative rotation. A first cam lobe is fixedly attached to the outer shaft and a second cam lobe is fixedly attached to the inner shaft. An exemplary dual-concentric camshaft including an inner shaft and an outer shaft is disclosed in U.S. Pat. No. 7,069,892, the contents of which are incorporated herein by reference.

In accordance with this disclosure, a VCP system is operatively coupled to the dual-concentric camshaft. The VCP system may be operatively coupled to one or both of the inner and outer shafts of the dual-concentric camshaft. A VCP system coupled to one of the inner and outer shafts includes a single-phase adjuster configured to adjust the phase relationship of the respective coupled inner or outer shaft in relation to the engine crankshaft 12. A VCP system coupled to both the inner and outer shafts includes respective first and second phase adjusters configured such that one of the phase adjusters adjusts the phase relationship of the outer shaft in relation to the engine crankshaft 12, and the other phase adjuster is adjusts the phase relationship of the inner shaft in relation to the engine crankshaft 12. Intervening drive mechanisms such as gears, pulleys, belts, chains and the like may be located to transmit crankshaft rotation to the camshaft, including via the VCP system as the case may be to effect camshaft rotation in accordance with phase adjustments made by the VCP system. In a preferred embodiment, a single cam timing belt provides the rotative drive coupling between the engine crankshaft 12 and all of the engine camshafts. The VCP system is controlled by the control module. Cam position sensors preferably monitor rotational position of each of the inner and outer shafts with respect to the engine crankshaft and provides control feedback to the control module. Thus individual inner and outer shaft phases relative to the crankshaft are determined (i.e. absolute phase) from which relative inner and outer shaft phase (i.e. relative phase) may readily be derived. The range of phasing authority is defined and limited by the hardware of the VCP system and the control system which actuates the VCP system. The VCP systems may be actuated using one of electro-hydraulic, hydraulic, and electric control force, controlled by the control module. One exemplary VCP system is disclosed in US Pat. Pub. 2007/0272183, the contents of which are incorporated herein by reference.

Figure 2:
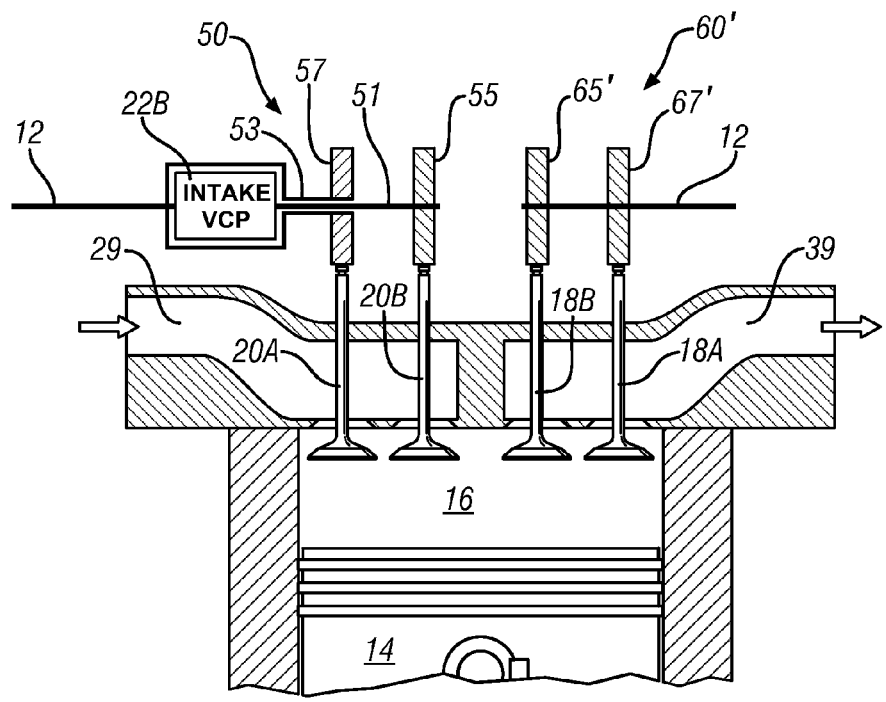
FIG. 2 schematically illustrates a first embodiment of a dual overhead camshaft engine in accordance with the present disclosure.

With particular reference to the embodiment of FIG. 2, the intake valvetrain includes a dual-concentric intake camshaft 50 including an inner shaft 51 and an outer shaft 53. Inner and outer shafts 51, 53 are configured concentrically and capable, within limits, of relative rotation. A first intake cam lobe 57 is fixedly attached to the outer shaft 53 and a second intake cam lobe 55 is fixedly attached to the inner shaft 51. Single-phase adjuster intake VCP system 22B is operatively coupled to the inner shafts 51 of dual-concentric intake camshaft 50 and includes a phase adjuster. The phase adjuster is configured to adjust the phase relationship of the inner shaft 51 in relation to the engine crankshaft 12. One having ordinary skill in the art will appreciate that while the presently described and illustrated embodiment wherein the one of the inner and outer shafts that is phase adjustable is the inner shaft 51, alternative phase adjustment of the outer shaft 53 is a substantially equivalent arrangement. The exhaust valvetrain includes single-shaft exhaust camshaft 60' with first and second exhaust cam lobes 67', 65' fixedly attached to thereto such that first and second exhaust cam lobes 67', 65' are in a fixed relative phase with each other. The phase relationship of the single-shaft exhaust camshaft 60' is fixed in relation to the engine crankshaft 12.

Figure 3:
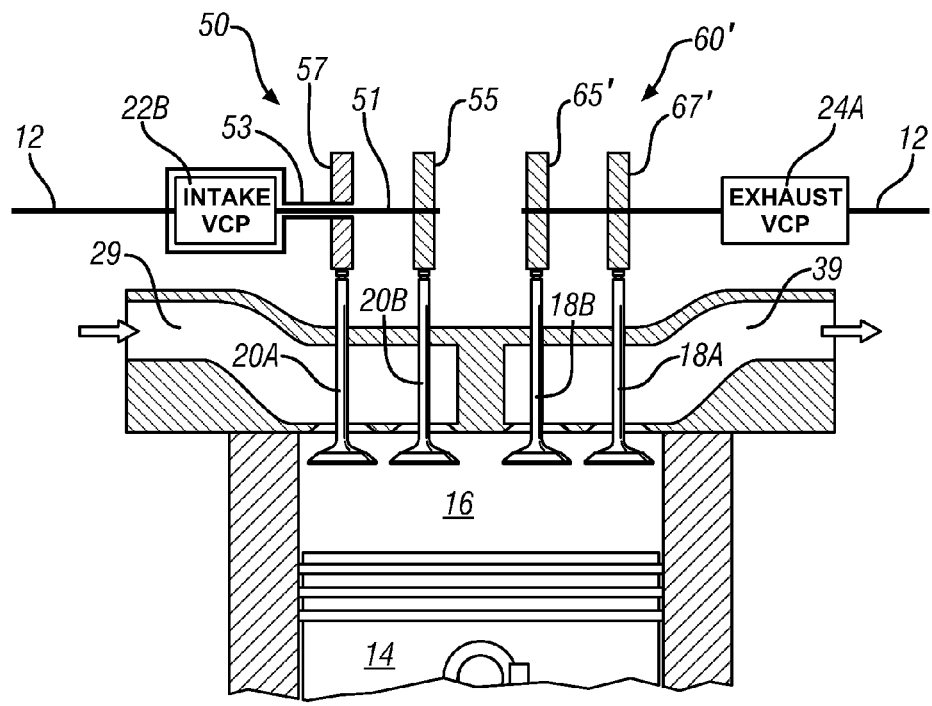
FIG. 3 schematically illustrates a second embodiment of a dual overhead camshaft engine in accordance with the present disclosure.

With particular reference to the embodiment of FIG. 3, the intake valvetrain includes a dual-concentric intake camshaft 50 including an inner shaft 51 and an outer shaft 53. Inner and outer shafts 51, 53 are configured concentrically and capable, within limits, of relative rotation. A first intake cam lobe 57 is fixedly attached to the outer shaft 53 and a second intake cam lobe 55 is fixedly attached to the inner shaft 51. Single-phase adjuster intake VCP system 22B is operatively coupled to the inner shafts 51 of dual-concentric intake camshaft 50 and includes a phase adjuster. The phase adjuster is configured to adjust the phase relationship of the inner shaft 51 in relation to the engine crankshaft 12. One having ordinary skill in the art will appreciate that while the presently described and illustrated embodiment wherein the one of the inner and outer shafts that is phase adjustable is the inner shaft 51, alternative phase adjustment of the outer shaft 53 is a substantially equivalent arrangement. The exhaust valvetrain includes single-shaft exhaust camshaft 60' with first and second exhaust cam lobes 67', 65' fixedly attached thereto such that first and second exhaust cam lobes 67', 65' are in a fixed relative phase with each other. Exhaust VCP system 24A is operatively coupled to the single-shaft exhaust camshaft 60' and includes a phase adjuster. The phase adjuster is configured to adjust the phase relationship of the single-shaft exhaust camshaft 60' in relation to the engine crankshaft 12.

Figure 4:
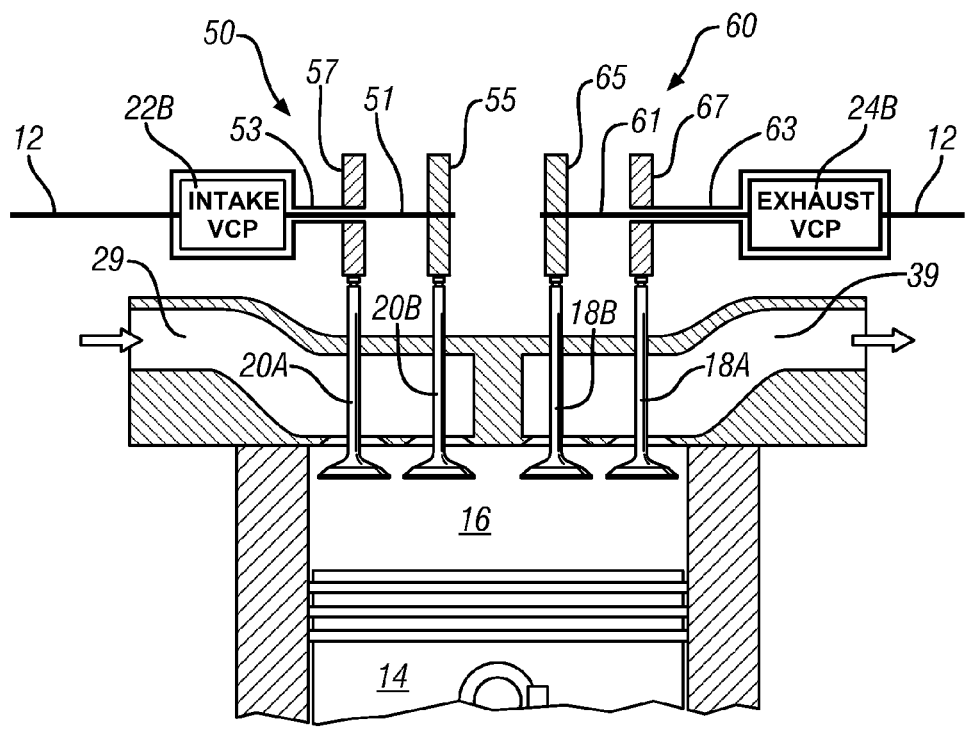
FIG. 4 schematically illustrates a third embodiment of a dual overhead camshaft engine in accordance with the present disclosure.

With particular reference to the embodiment of FIG. 4, the intake valvetrain includes a dual-concentric intake camshaft 50 including an inner shaft 51 and an outer shaft 53. Inner and outer shafts 51, 53 are configured concentrically and capable, within limits, of relative rotation. A first intake cam lobe 57 is fixedly attached to the outer shaft 53 and a second intake cam lobe 55 is fixedly attached to the inner shaft 51. Single-phase adjuster intake VCP system 22B is operatively coupled to the inner shafts 51 of dual-concentric intake camshaft 50 and includes a phase adjuster. The phase adjuster is configured to adjust the phase relationship of the inner shaft 51 in relation to the engine crankshaft 12. One having ordinary skill in the art will appreciate that while the presently described and illustrated embodiment wherein the one of the inner and outer shafts that is phase adjustable is the inner shaft 51, alternative phase adjustment of the outer shaft 53 is a substantially equivalent arrangement. The exhaust valvetrain includes a dual-concentric exhaust camshaft 60 including an inner shaft 61 and an outer shaft 63. Inner and outer shafts 61, 63 are configured concentrically and capable, within limits, of relative rotation. A first exhaust cam lobe 67 is fixedly attached to the outer shaft 63 and a second exhaust cam lobe 65 is fixedly attached to the inner shaft 61. Single-phase adjuster exhaust VCP system 24B is operatively coupled to the inner shaft 61 of dual-concentric exhaust camshaft 60 and includes a phase adjuster. The phase adjuster is configured to adjust the phase relationship of the inner shaft 61 in relation to the engine crankshaft 12. One having ordinary skill in the art will appreciate that while the presently described and illustrated embodiment wherein the one of the inner and outer shafts that is phase adjustable is the inner shaft 61, alternative phase adjustment of the outer shaft 63 is a substantially equivalent arrangement.

Figure 5:
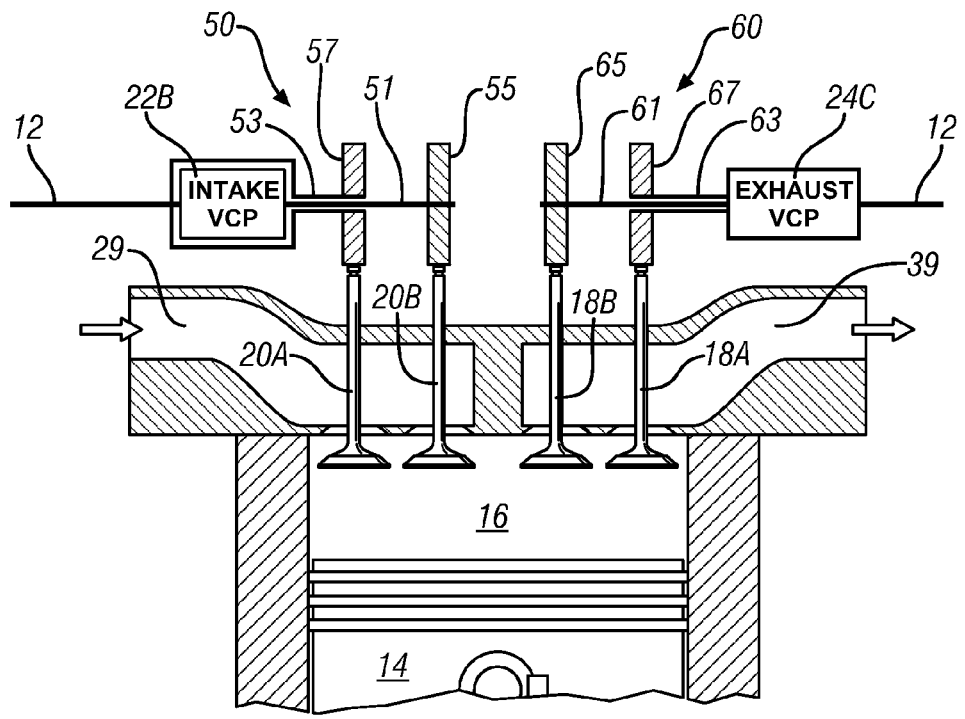
FIG. 5 schematically illustrates a fourth embodiment of a dual overhead camshaft engine in accordance with the present disclosure.

With particular reference to the embodiment of FIG. 5, the intake valvetrain includes a dual-concentric intake camshaft 50 including an inner shaft 51 and an outer shaft 53. Inner and outer shafts 51, 53 are configured concentrically and capable, within limits, of relative rotation. A first intake cam lobe 57 is fixedly attached to the outer shaft 53 and a second intake cam lobe 55 is fixedly attached to the inner shaft 51. Single-phase adjuster intake VCP system 22B is operatively coupled to the inner shafts 51 of dual-concentric intake camshaft 50 and includes a phase adjuster. The phase adjuster is configured to adjust the phase relationship of the inner shaft 51 in relation to the engine crankshaft 12. One having ordinary skill in the art will appreciate that while the presently described and illustrated embodiment wherein the one of the inner and outer shafts that is phase adjustable is the inner shaft 51, alternative phase adjustment of the outer shaft 53 is a substantially equivalent arrangement. The exhaust valvetrain includes a dual-concentric exhaust camshaft 60 including an inner shaft 61 and an outer shaft 63. Inner and outer shafts 61, 63 are configured concentrically and capable, within limits, of relative rotation. A first exhaust cam lobe 67 is fixedly attached to the outer shaft 63 and a second exhaust cam lobe 65 is fixedly attached to the inner shaft 61. Dual-phase adjuster exhaust VCP system 24C is operatively coupled to the inner and outer shafts 61, 63 of dual-concentric exhaust camshaft 60 and includes respective first and second phase adjusters. The first phase adjuster is configured to adjust the phase relationship of the outer shaft 63 in relation to the engine crankshaft 12, whereas the second phase adjuster is configured to adjust the phase relationship of the inner shaft 61 in relation to the engine crankshaft 12.

Figure 6:
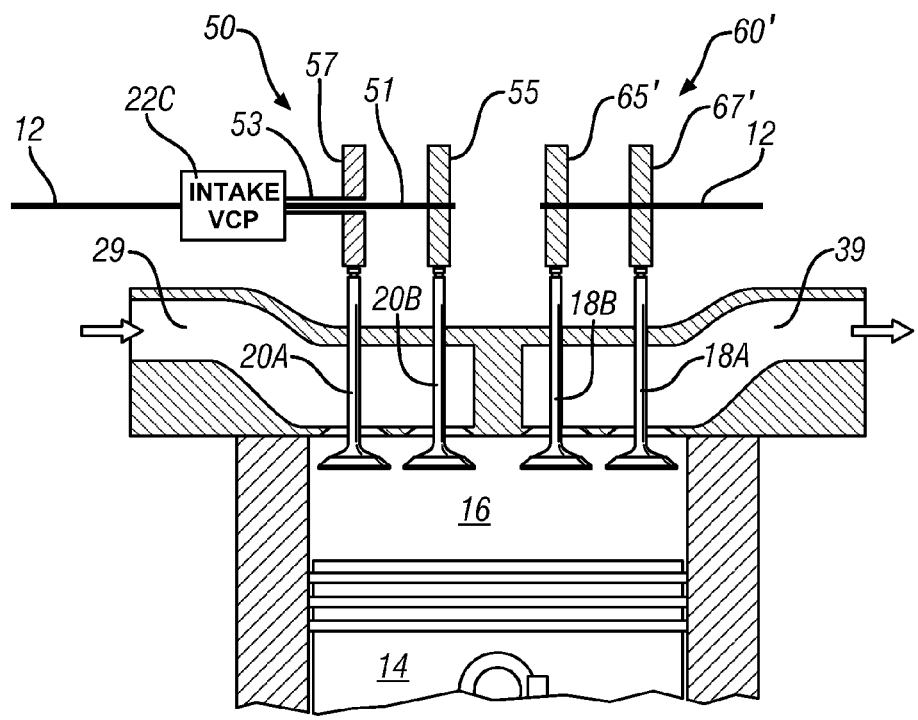
FIG. 6 schematically illustrates a fifth embodiment of a dual overhead camshaft engine in accordance with the present disclosure.

With particular reference to the embodiment of FIG. 6, the intake valvetrain includes a dual-concentric intake camshaft 50 including an inner shaft 51 and an outer shaft 53. Inner and outer shafts 51, 53 are configured concentrically and capable, within limits, of relative rotation. A first intake cam lobe 57 is fixedly attached to the outer shaft 53 and a second intake cam lobe 55 is fixedly attached to the inner shaft 51. Dual-phase adjuster intake VCP system 22C is operatively coupled to the inner and outer shafts 51, 53 of dual-concentric intake camshaft 50 and includes respective first and second phase adjusters. The first phase adjuster is configured to adjust the phase relationship of the outer shaft 53 in relation to the engine crankshaft 12, whereas the second phase adjuster is configured to adjust the phase relationship of the inner shaft 51 in relation to the engine crankshaft 12. The exhaust valvetrain includes single-shaft exhaust camshaft 60' with first and second exhaust cam lobes 67', 65' fixedly attached to thereto such that first and second exhaust cam lobes 67', 65' are in a fixed relative phase with each other. The phase relationship of the single-shaft exhaust camshaft 60' is fixed in relation to the engine crankshaft 12.

Figure 7:
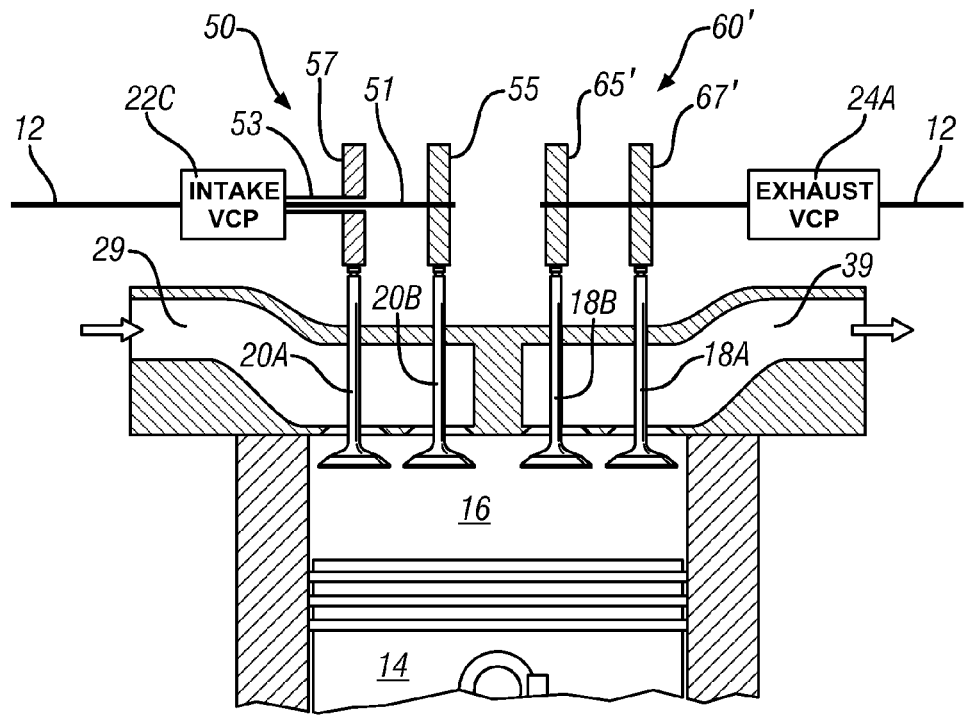
FIG. 7 schematically illustrates a sixth embodiment of a dual overhead camshaft engine in accordance with the present disclosure.

With particular reference to the embodiment of FIG. 7, the intake valvetrain includes a dual-concentric intake camshaft 50 including an inner shaft 51 and an outer shaft 53. Inner and outer shafts 51, 53 are configured concentrically and capable, within limits, of relative rotation. A first intake cam lobe 57 is fixedly attached to the outer shaft 53 and a second intake cam lobe 55 is fixedly attached to the inner shaft 51. Dual-phase adjuster intake VCP system 22C is operatively coupled to the inner and outer shafts 51, 53 of dual-concentric intake camshaft 50 and includes respective first and second phase adjusters. The first phase adjuster is configured to adjust the phase relationship of the outer shaft 53 in relation to the engine crankshaft 12, whereas the second phase adjuster is configured to adjust the phase relationship of the inner shaft 51 in relation to the engine crankshaft 12. The exhaust valvetrain includes single-shaft exhaust camshaft 60' with first and second exhaust cam lobes 67', 65' fixedly attached thereto such that first and second exhaust cam lobes 67', 65' are in a fixed relative phase with each other. Exhaust VCP system 24A is operatively coupled to the single-shaft exhaust camshaft 60' and includes a phase adjuster. The phase adjuster is configured to adjust the phase relationship of the single-shaft exhaust camshaft 60' in relation to the engine crankshaft 12.

Figure 8:
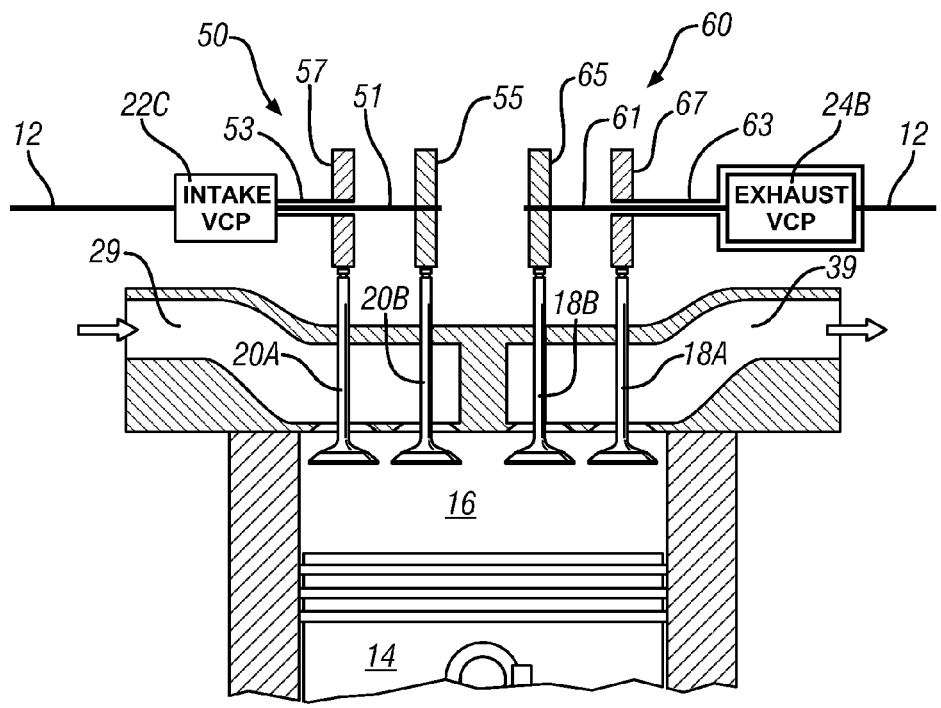
FIG. 8 schematically illustrates a seventh embodiment of a dual overhead camshaft engine in accordance with the present disclosure.

With particular reference to the embodiment of FIG. 8, the intake valvetrain includes a dual-concentric intake camshaft 50 including an inner shaft 51 and an outer shaft 53. Inner and outer shafts 51, 53 are configured concentrically and capable, within limits, of relative rotation. A first intake cam lobe 57 is fixedly attached to the outer shaft 53 and a second intake cam lobe 55 is fixedly attached to the inner shaft 51. Dual-phase adjuster intake VCP system 22C is operatively coupled to the inner and outer shafts 51, 53 of dual-concentric intake camshaft 50 and includes respective first and second phase adjusters. The first phase adjuster is configured to adjust the phase relationship of the outer shaft 53 in relation to the engine crankshaft 12, whereas the second phase adjuster is configured to adjust the phase relationship of the inner shaft 51 in relation to the engine crankshaft 12. The exhaust valvetrain includes a dual-concentric exhaust camshaft 60 including an inner shaft 61 and an outer shaft 63. Inner and outer shafts 61, 63 are configured concentrically and capable, within limits, of relative rotation. A first exhaust cam lobe 67 is fixedly attached to the outer shaft 63 and a second exhaust cam lobe 65 is fixedly attached to the inner shaft 61. Single-phase adjuster exhaust VCP system 24B is operatively coupled to the inner shaft 61 of dual-concentric exhaust camshaft 60 and includes a phase adjuster. The phase adjuster is configured to adjust the phase relationship of the inner shaft 61 in relation to the engine crankshaft 12. One having ordinary skill in the art will appreciate that while the presently described and illustrated embodiment wherein the one of the inner and outer shafts that is phase adjustable is the inner shaft 61, alternative phase adjustment of the outer shaft 63 is a substantially equivalent arrangement.

Figure 9:
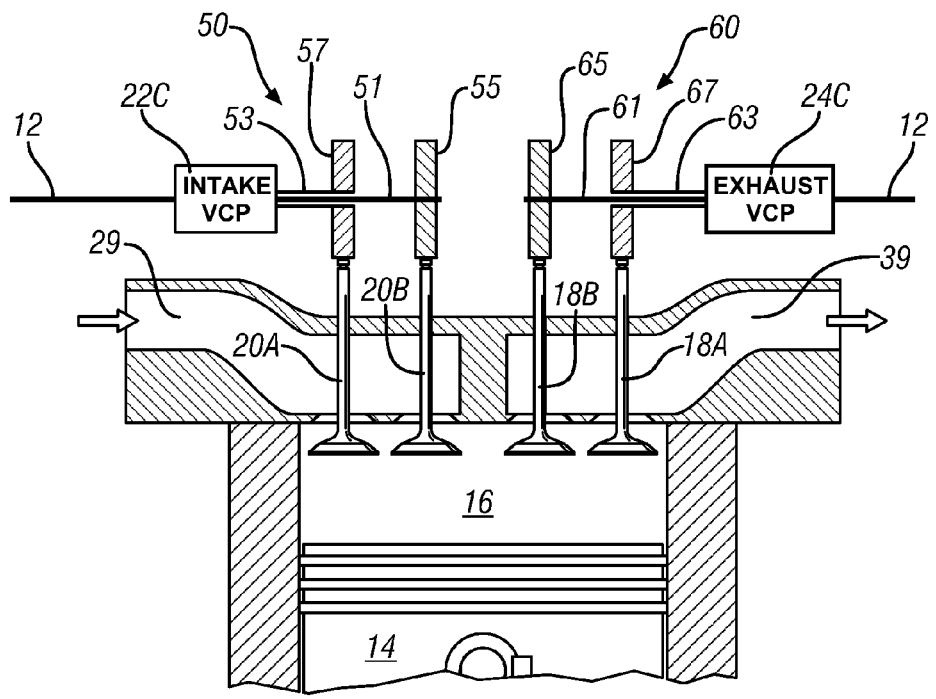
FIG. 9 schematically illustrates a eighth embodiment of a dual overhead camshaft engine in accordance with the present disclosure.

With particular reference to the embodiment of FIG. 9, the intake valvetrain includes a dual-concentric intake camshaft 50 including an inner shaft 51 and an outer shaft 53. Inner and outer shafts 51, 53 are configured concentrically and capable, within limits, of relative rotation. A first intake cam lobe 57 is fixedly attached to the outer shaft 53 and a second intake cam lobe 55 is fixedly attached to the inner shaft 51. Dual-phase adjuster intake VCP system 22C is operatively coupled to the inner and outer shafts 51, 53 of dual-concentric intake camshaft 50 and includes respective first and second phase adjusters. The first phase adjuster is configured to adjust the phase relationship of the outer shaft 53 in relation to the engine crankshaft 12, whereas the second phase adjuster is configured to adjust the phase relationship of the inner shaft 51 in relation to the engine crankshaft 12. The exhaust valvetrain includes a dual-concentric exhaust camshaft 60 including an inner shaft 61 and an outer shaft 63. Inner and outer shafts 61, 63 are configured concentrically and capable, within limits, of relative rotation. A first exhaust cam lobe 67 is fixedly attached to the outer shaft 63 and a second exhaust cam lobe 65 is fixedly attached to the inner shaft 61. Dual-phase adjuster exhaust VCP system 24C is operatively coupled to the inner and outer shafts 61, 63 of dual-concentric exhaust camshaft 60 and includes respective first and second phase adjusters. The first phase adjuster is configured to adjust the phase relationship of the outer shaft 63 in relation to the engine crankshaft 12, whereas the second phase adjuster is configured to adjust the phase relationship of the inner shaft 61 in relation to the engine crankshaft 12.

Figure 10:
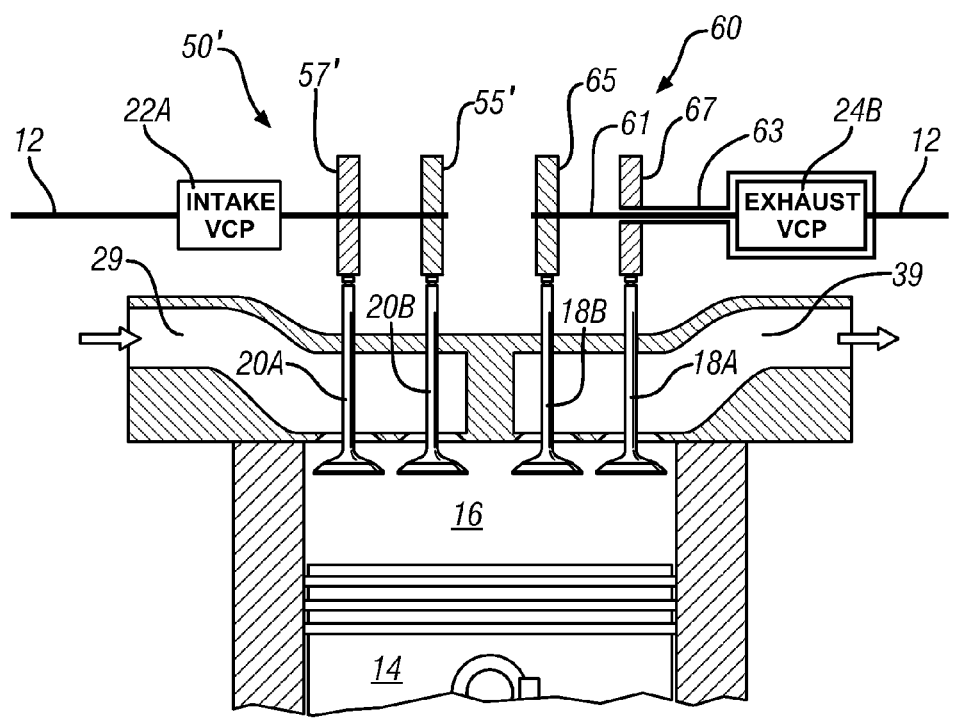
FIG. 10 schematically illustrates a ninth embodiment of a dual overhead camshaft engine in accordance with the present disclosure.

With particular reference to the embodiment of FIG. 10, the intake valvetrain includes single-shaft intake camshaft 50' with first and second intake cam lobes 57', 55' fixedly attached thereto such that first and second intake cam lobes 57', 55' are in a fixed relative phase with each other. Intake VCP system 22A is operatively coupled to the single-shaft intake camshaft 50' and includes a phase adjuster. The phase adjuster is configured to adjust the phase relationship of the single-shaft intake camshaft 50' in relation to the engine crankshaft 12. The exhaust valvetrain includes a dual-concentric exhaust camshaft 60 including an inner shaft 61 and an outer shaft 63. Inner and outer shafts 61, 63 are configured concentrically and capable, within limits, of relative rotation. A first exhaust cam lobe 67 is fixedly attached to the outer shaft 63 and a second exhaust cam lobe 65 is fixedly attached to the inner shaft 61. Single-phase adjuster exhaust VCP system 24B is operatively coupled to the inner shaft 61 of dual-concentric exhaust camshaft 60 and includes a phase adjuster. The phase adjuster is configured to adjust the phase relationship of the inner shaft 61 in relation to the engine crankshaft 12. One having ordinary skill in the art will appreciate that while the presently described and illustrated embodiment wherein the one of the inner and outer shafts that is phase adjustable is the inner shaft 61, alternative phase adjustment of the outer shaft 63 is a substantially equivalent arrangement.

Figure 11:
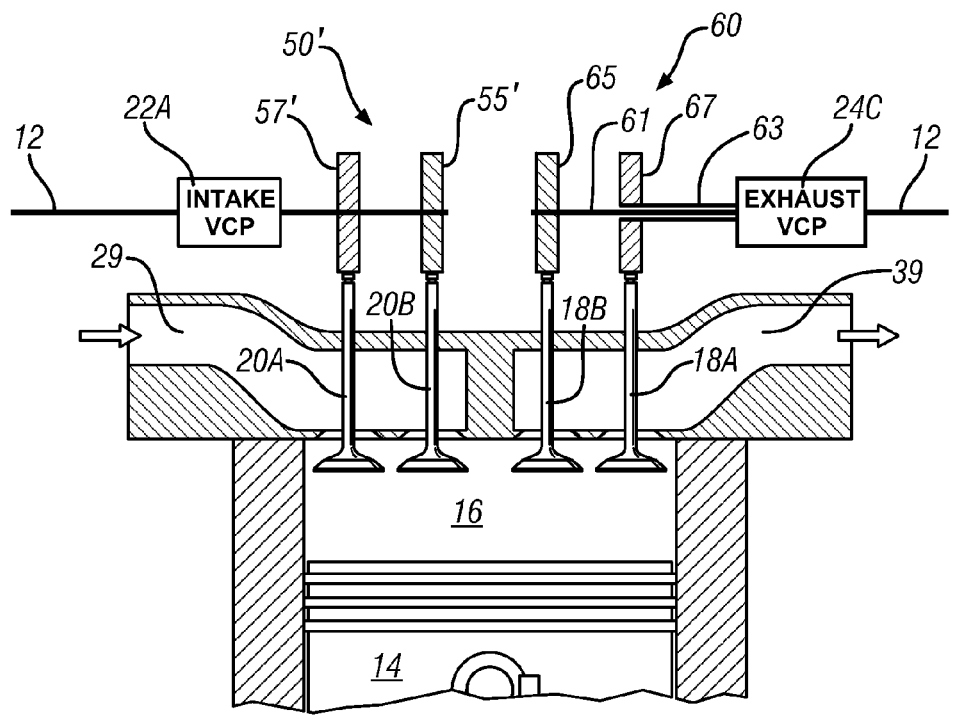
FIG. 11 schematically illustrates a tenth embodiment of a dual overhead camshaft engine in accordance with the present disclosure.

With particular reference to the embodiment of FIG. 11, the intake valvetrain includes single-shaft intake camshaft 50' with first and second intake cam lobes 57', 55' fixedly attached thereto such that first and second intake cam lobes 57', 55' are in a fixed relative phase with each other. Intake VCP system 22A is operatively coupled to the single-shaft intake camshaft 50' and includes a phase adjuster. The phase adjuster is configured to adjust the phase relationship of the single-shaft intake camshaft 50' in relation to the engine crankshaft 12. The exhaust valvetrain includes a dual-concentric exhaust camshaft 60 including an inner shaft 61 and an outer shaft 63. Inner and outer shafts 61, 63 are configured concentrically and capable, within limits, of relative rotation. A first exhaust cam lobe 67 is fixedly attached to the outer shaft 63 and a second exhaust cam lobe 65 is fixedly attached to the inner shaft 61. Dual-phase adjuster exhaust VCP system 24C is operatively coupled to the inner and outer shafts 61, 63 of dual-concentric exhaust camshaft 60 and includes respective first and second phase adjusters. The first phase adjuster is configured to adjust the phase relationship of the outer shaft 63 in relation to the engine crankshaft 12, whereas the second phase adjuster is configured to adjust the phase relationship of the inner shaft 61 in relation to the engine crankshaft 12.

Figure 12:
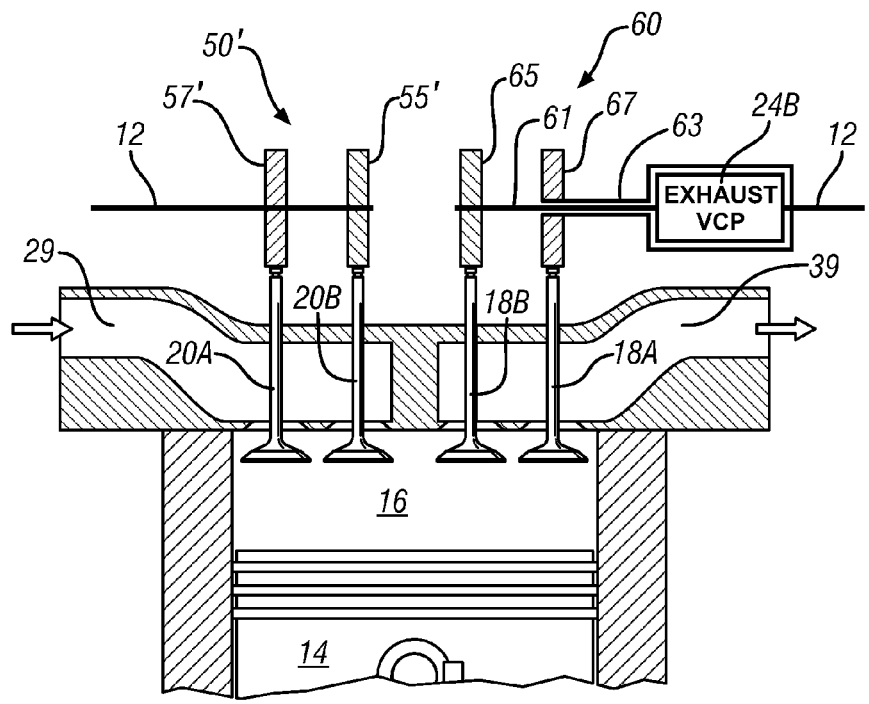
FIG. 12 schematically illustrates a eleventh embodiment of a dual overhead camshaft engine in accordance with the present disclosure.

With particular reference to the embodiment of FIG. 12, the intake valvetrain includes single-shaft intake camshaft 50' with first and second intake cam lobes 57', 55' fixedly attached to thereto such that first and second intake cam lobes 57', 55' are in a fixed relative phase with each other. The phase relationship of the single-shaft intake camshaft 50' is fixed in relation to the engine crankshaft 12. The exhaust valvetrain includes a dual-concentric exhaust camshaft 60 including an inner shaft 61 and an outer shaft 63. Inner and outer shafts 61, 63 are configured concentrically and capable, within limits, of relative rotation. A first exhaust cam lobe 67 is fixedly attached to the outer shaft 63 and a second exhaust cam lobe 65 is fixedly attached to the inner shaft 61. Single-phase adjuster exhaust VCP system 24B is operatively coupled to the inner shaft 61 of dual-concentric exhaust camshaft 60 and includes a phase adjuster. The phase adjuster is configured to adjust the phase relationship of the inner shaft 61 in relation to the engine crankshaft 12. One having ordinary skill in the art will appreciate that while the presently described and illustrated embodiment wherein the one of the inner and outer shafts that is phase adjustable is the inner shaft 61, alternative phase adjustment of the outer shaft 63 is a substantially equivalent arrangement.

Figure 13:
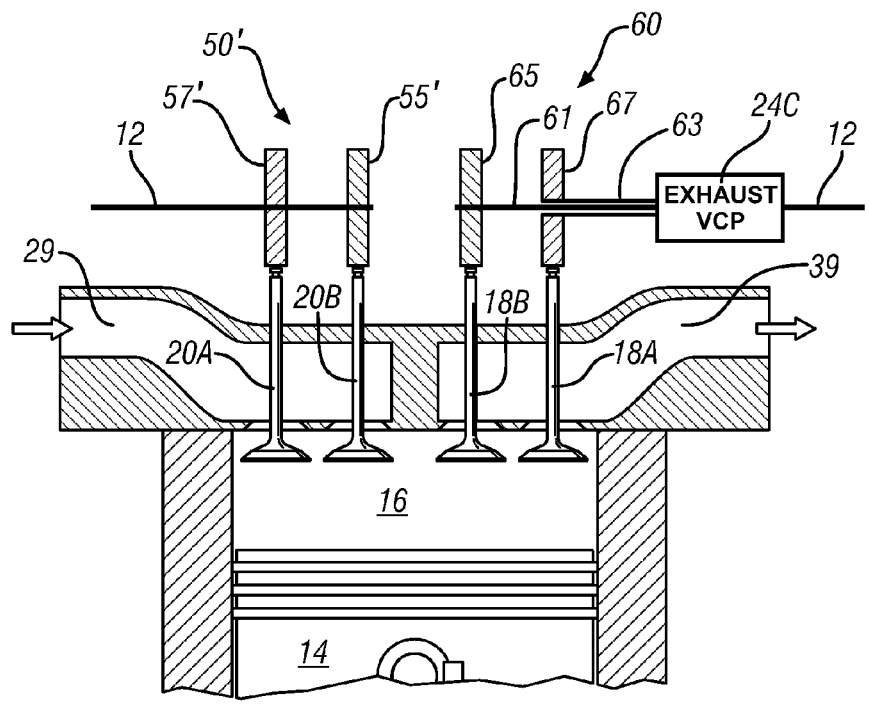
FIG. 13 schematically illustrates a twelfth embodiment of a dual overhead camshaft engine in accordance with the present disclosure.

With particular reference to the embodiment of FIG. 13, the intake valvetrain includes single-shaft intake camshaft 50' with first and second intake cam lobes 57', 55' fixedly attached to thereto such that first and second intake cam lobes 57', 55' are in a fixed relative phase with each other. The phase relationship of the single-shaft intake camshaft 50' is fixed in relation to the engine crankshaft 12. The exhaust valvetrain includes a dual-concentric exhaust camshaft 60 including an inner shaft 61 and an outer shaft 63. Inner and outer shafts 61, 63 are configured concentrically and capable, within limits, of relative rotation. A first exhaust cam lobe 67 is fixedly attached to the outer shaft 63 and a second exhaust cam lobe 65 is fixedly attached to the inner shaft 61. Dual-phase adjuster exhaust VCP system 24C is operatively coupled to the inner and outer shafts 61, 63 of dual-concentric exhaust camshaft 60 and includes respective first and second phase adjusters. The first phase adjuster is configured to adjust the phase relationship of the outer shaft 63 in relation to the engine crankshaft 12, whereas the second phase adjuster is configured to adjust the phase relationship of the inner shaft 61 in relation to the engine crankshaft 12.

The single-phase adjuster VCP embodiments of FIGS. 2-5, wherein only the inner shaft 51 of dual-concentric intake camshaft 50 is configured for selective phase adjustment, and the alternatives wherein only the outer shaft 53 of dual-concentric intake camshaft 50 is configured for selective phase adjustment, enable the phasing of one of the first and second intake valves to effect early intake valve opening or late intake valve closing in accordance with the phasing direction of the selectively phase adjustable intake valve. The dual-phase adjuster VCP embodiments of FIGS. 6-9, wherein both the inner and outer shafts 51, 53 of dual-concentric intake camshaft 50 are configured for selective phase adjustment, enables the phasing of both the first and second intake valves to effect early intake valve opening, late intake valve closing, or both early and late intake valve closings in accordance with the phasing direction(s) of the selectively phase adjustable intake valves.

Similarly, the single-phase adjuster VCP embodiments of FIGS. 4, 8, 10, and 12 wherein only the inner shaft 61 of dual-concentric exhaust camshaft 60 is configured for selective phase adjustment, and the alternatives wherein only the outer shaft 63 of dual-concentric exhaust camshaft 60 is configured for selective phase adjustment, enable the phasing of one of the first and second exhaust valves to effect early exhaust valve opening or late exhaust valve closing in accordance with the phasing direction of the selectively phase adjustable exhaust valve. The dual-phase adjuster VCP embodiments of FIGS. 5, 9, 11, and 13, wherein both the inner and outer shafts 61, 63 of dual-concentric exhaust camshaft 60 are configured for selective phase adjustment, enables the phasing of both the first and second exhaust valves to effect early exhaust valve opening, late exhaust valve closing, or both early and late exhaust valve closings in accordance with the phasing direction(s) of the selectively phase adjustable exhaust valves.

Each of the various embodiments of FIGS. 2-9 employing dual-concentric intake camshafts 50, whether configured with a single-phase adjuster VCP 22B (FIGS. 2-5) or a dual-phase adjuster VCP 22C (FIGS. 6-9), may have variously configured exhaust valvetrains including with dual-concentric exhaust camshafts 60 configured with a single-phase adjuster VCP 24B (FIGS. 4 and 8) or a dual-phase adjuster VCP 24C (FIGS. 5 and 9), and single-shaft exhaust camshafts 60' configured with an exhaust VCP 24A (FIGS. 3 and 7) or without an exhaust VCP (FIGS. 2 and 6).

Similarly, each of the various embodiments of FIGS. 4, 5 and 8-13 employing dual-concentric exhaust camshafts 60, whether configured with a single-phase adjuster VCP 24B (FIGS. 4, 8, 10, and 12) or a dual-phase adjuster VCP 24C (FIGS. 5, 9, 11, and 13), may have variously configured intake valvetrains including with dual-concentric intake camshafts 50 configured with a single-phase adjuster VCP 22B (FIGS. 2-5) or a dual-phase adjuster VCP 22C (FIGS. 6-9), and single-shaft intake camshafts 50' configured with an intake VCP 22A (FIGS. 10 and 11) or without an intake VCP (FIGS. 12 and 13).

Dual overhead camshaft engines configured with intake valvetrains having a dual-concentric intake camshaft and a single-phase or a dual-phase adjuster VCP enable operation with lower pumping losses over a continuous and wide range of operating conditions and enhancement of in-cylinder charge motion, both of which provide fuel economy benefits. The pumping losses are primarily reduced by delaying the intake valve closing of one of the two intake valves to accomplish late intake valve closing, thus allowing the engine to operate at higher intake-manifold pressures over a wider range of operating conditions. In addition, higher in-cylinder charge motion is generated to enhance the combustion process as the intake charge is initially directed through a single valve to generate a combination of swirl and tumble flows within the combustion chamber. This higher level of charge motion enhances the combustion process, allowing the engine to be calibrated at higher dilution levels, which also adds to the fuel economy benefit. This higher dilution may be supplied externally, via an EGR valve, or may be internally controlled through independent phase adjustability of both the first and second intake valves by advancing the opening of one of the intake valves to effect expelling exhaust gases into the intake port during the exhaust stroke which get reingested during the intake stroke, thereby accomplishing more internal EGR. Internal EGR can be increased by retarding the exhaust valve closing such that it occurs during the intake stroke, thereby reingesting exhaust gases from the exhaust port during the intake stroke. These intake and exhaust port exhaust gas reingestion schemes can be implemented independently or in combination. It is also envisioned to accomplish internal EGR by exhaust gas trapping through early exhaust valve closure during the exhaust stroke.

As generally applied to engines operating lean of stoichiometry and diesel engines, a delay in closing of one or both of the first and second intake valves can reduce engine-out NOx emission levels by reducing the effective compression ratio, lowering the in-cylinder charge temperature, and lowering the engine-out NOx emission levels. Reducing NOx emissions in engines operating lean of stoichiometric conditions is desirable. Individual intake valve phasing in accordance with the disclosure accomplishes the desired late-intake valve closing. In addition, engines operating lean of stoichiometry benefit from high levels of in-cylinder charge motion for optimal performance. Individual intake and exhaust valve phasing generates higher levels of required charge motion.

Specifically for application in diesel engines, delaying the intake-valve-closing event is an effective means for reducing the engine-out NOx emission levels. Here, the delayed intake-valve-closing event reduces the effective compression ratio, lowers the in-cylinder charge temperature, and ultimately lowers the engine-out NOx emission levels. As the diesel engine operates lean of stoichiometric conditions, these emissions can not be consumed by the conventional three-way catalyst and lean aftertreatment is required to manage these lean NOx emissions. Because lean aftertreatment is limited in terms of how well the NOx emissions can be consumed, it becomes important to minimize the NOx emissions that the engine generates. Thus in accordance with the various embodiments configured with intake valvetrains enabling delayed intake valve closing, such results can be effected. In addition, the diesel engine typically requires high levels of in-cylinder charge motion for optimal performance and this particular concept would help to generate the required charge motion whereby the intake charge is initially and finally directed through a single valve leading to higher gas velocity and enhanced swirl and tumble mixture motion flow amplitude.

Advancing the phasing of only one of the intake valves has an effect of generating more optimized levels of internal EGR while not increasing the effective displacement of the engine or increasing pumping losses by virtue of the effective intake valve closing time remaining nominal in accordance with the other intake valve phasing. Another effect is that a more optimal level of internal EGR can be achieved without compromising the efficiency improvement by sub-optimizing the exhaust valve opening timing. By retarding only one of the intake valves, longer effective valve lift duration is achieved for each cylinder. Such retarding effects the reduction of effective engine displacement and pumping losses. With diesel engines, this embodiment can provide the majority of the NOx reduction benefits by reducing the effective compression ratio. The combination of late closing of one of two intake valves and the early opening of the other intake valve effects an optimized level of internal EGR, an optimized level of effective displacement to be achieved, and an optimized timing of exhaust valve opening for maximum effective expansion ratio of the power stroke. With diesel engine applications, this can allow for optimized levels of internal EGR with a reduction of effective compression ratio and NOx emissions.

Similar embodiments of the exhaust camshaft arrangement may yield benefits related to increasing the exhaust enthalpy for devices such as catalysts and turbo-machinery without sub-optimizing the amount of EGR during the overlap period.

The operation of engines as described effects improved fuel economy by partially or fully unthrottling the gasoline engine during typical driving conditions. The extent to which the engine can be unthrottled will depend on the specific operating condition and valve events. The engine and strategy provide a combination of lower pumping work and enhanced in-cylinder charge motion, both of which improve the fuel economy of the gasoline engine. By delaying some but not all of the intake valves, sufficient valve overlap can be achieved to minimize pumping losses and maintain the fuel economy of the engine, as compared to phase delaying all intake valves together.

Figure 14A:
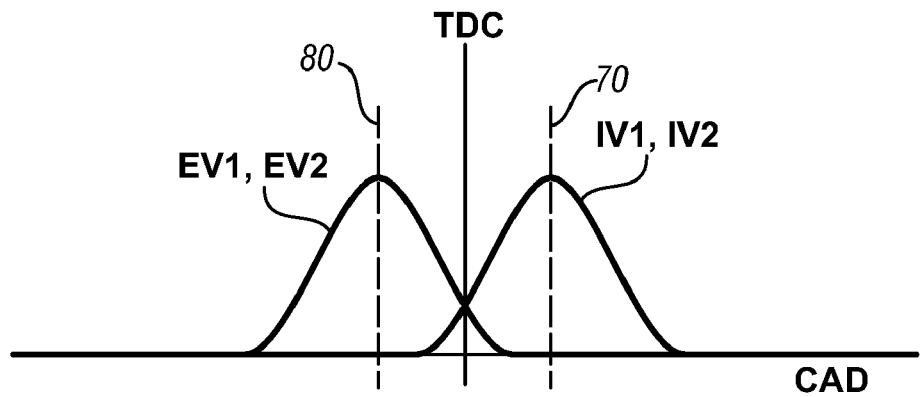
FIGS. 14A-14C illustrates a method of continuously variable differential phasing of intake valve operation in accordance with the present disclosure.
Figure 14B:
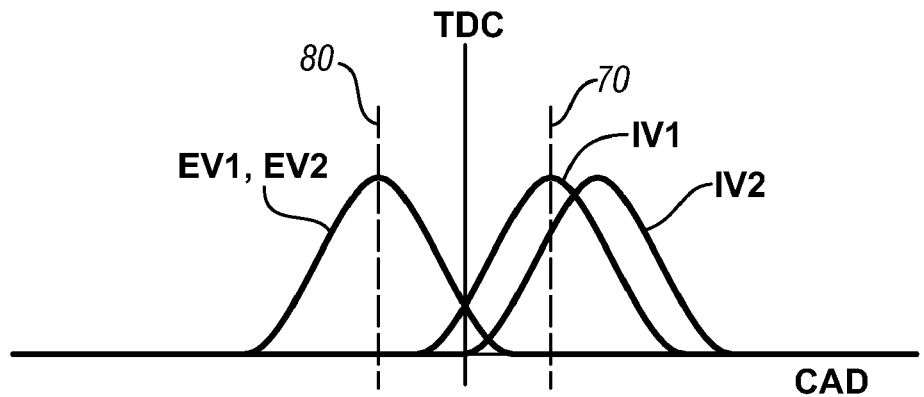
Figure 14C:
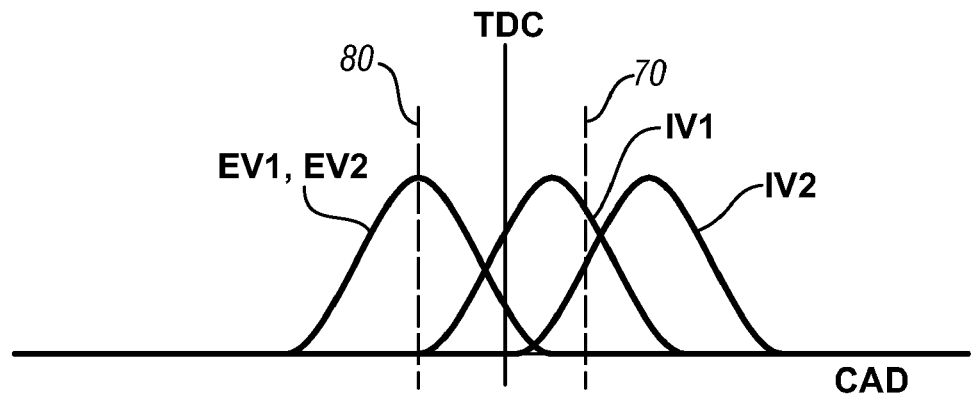

FIGS. 14A through 14B illustrates a method of continuously variable differential phasing of intake valve operation in accordance with the present disclosure. FIGS. 14A-14C illustrate top dead center (TDC) piston travel between exhaust and intake strokes in an exemplary engine. A first intake valve lift profile (IV1), second intake valve lift profile (IV2), first exhaust valve lift profile (EV1), and second exhaust valve lift profile (EV2) are illustrated relative to crank angle (CAD). FIGS. 14A-14C also illustrate a nominal intake valve phase metric 70 relative to peak intake valve opening and a nominal exhaust valve phase metric 80 relative to peak exhaust valve opening. The intake and exhaust valve profiles illustrated in FIG. 14A are thus referred to as nominal profiles and one having ordinary skill in the art would understand such profiles to be substantially consistent with a conventional internal combustion engine operation having a nominal positive valve overlap at top dead center.

FIG. 14B illustrates phase control of the second intake valve in a manner which retards the valve profile IV2 from nominal, thereby resulting in a reduction in the effective compression ratio of the engine as described in further detail herein above. The illustrated control of FIG. 14B may be effected through a second intake cam being configured for phase control independently from a first intake cam. One skilled in the art will appreciate that such a configuration may also be utilized to advance the valve profile IV2 from nominal to effect an increase in internal exhaust gas recirculation as described in further detail herein above.

FIG. 14C, in addition to the phase control of the second intake valve described with respect to FIG. 14B, illustrates phase control of the first intake valve in a manner which advances the valve profile IV1 from nominal, thereby resulting in an increase in internal exhaust gas recirculation as described in further detail herein above. The illustrated control of FIG. 14C may be effected through the first intake cam being configured for phase control independently from the second intake cam. One skilled in the art will appreciate that such a configuration may also be utilized to retard the valve profile IV1 from nominal to effect a reduction in the effective compression ratio of the engine as described in further detail herein above.

One skilled in the art will appreciate that the exhaust valve profiles, EV1 and EV2, may similarly be phase controlled with an appropriate mechanization as set forth in further detail and combinations herein above. For example, either or both of first and second exhaust cams may be configured for phase adjustability to effect retarding or advancing of the respective exhaust valve profiles.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating an internal combustion engine including a crankshaft and first and second cam actuated intake valves, comprising:
   providing a first intake cam configured to actuate said first cam actuated intake valve;
   providing a second intake cam configured to actuate said second cam actuated intake valve, said second intake cam being phase adjustable relative to the crankshaft independently of the phase of the first intake cam relative to the crankshaft; and
   providing a controller configured to selectively retard the phase of the second intake cam to effect later closing of the second cam actuated intake valve sufficiently to reduce the effective compression ratio of the engine.

2. A method for operating an internal combustion engine as claimed in claim 1, further comprising:
    wherein said first intake cam is phase adjustable relative to the crankshaft independently of the phase of the second intake cam relative to the crankshaft; and
    wherein said controller is configured to selectively advance the phase of the first intake cam to effect earlier opening of the first cam actuated intake valve sufficiently to increase internal exhaust gas recirculation.

3. A method for operating an internal combustion engine as claimed in claim 1, said engine further including first and second cam actuated exhaust valves, further comprising:
    providing a first exhaust cam configured to actuate said first cam actuated exhaust valve;
    providing a second exhaust cam configured to actuate said second cam actuated exhaust valve, said second exhaust cam being phase adjustable relative to the crankshaft independently of the phase of the first exhaust cam relative to the crankshaft; and
    wherein said controller is configured to selectively retard the phase of the second exhaust cam to effect later closing of the second cam actuated exhaust valve sufficiently to increase internal exhaust gas recirculation.

4. A method for operating an internal combustion engine as claimed in claim 2, said engine further including first and second cam actuated exhaust valves, further comprising:
    providing a first exhaust cam configured to actuate said first cam actuated exhaust valve;
    providing a second exhaust cam configured to actuate said second cam actuated exhaust valve, said second exhaust cam being phase adjustable relative to the crankshaft independently of the phase of the first exhaust cam relative to the crankshaft; and
    wherein said controller is configured to selectively retard the phase of the second exhaust cam to effect later closing of the second cam actuated exhaust valve sufficiently to increase internal exhaust gas recirculation.

5. A method for operating an internal combustion engine as claimed in claim 1, said engine further including first and second cam actuated exhaust valves, further comprising:
    providing first and second exhaust cams configured to actuate said first and second cam actuated exhaust valves, said first and second exhaust cams having a fixed relative phase and being phase adjustable relative to the crankshaft; and
    wherein said controller is configured to selectively retard the phase of the first and second exhaust cams to effect later closing of the first and second cam actuated exhaust valves sufficiently to increase internal exhaust gas recirculation.

6. A method for operating an internal combustion engine as claimed in claim 2, said engine further including first and second cam actuated exhaust valves, further comprising:
    providing first and second exhaust cams configured to actuate said first and second cam actuated exhaust valves, said first and second exhaust cams having a fixed relative phase and being phase adjustable relative to the crankshaft; and
    wherein said controller is configured to selectively retard the phase of the first and second exhaust cams to effect later closing of the first and second cam actuated exhaust valves sufficiently to increase internal exhaust gas recirculation.

7. A dual overhead camshaft direct injection internal combustion engine having a bank of cylinders including a plurality of intake valves per cylinder, a plurality of exhaust valves per cylinder, and an intake valve camshaft, the improvement comprising:
    said intake valve camshaft having respective concentric inner and outer shafts configured for variable phasing therebetween, said intake valve camshaft including a first intake cam lobe per cylinder configured to actuate a first intake valve per cylinder and a second intake cam lobe per cylinder configured to actuate a second intake valve per cylinder, said first intake cam lobes fixedly coupled to said outer shaft, said second intake cam lobes fixedly coupled to said inner shaft, whereby the first intake valves per cylinder and the second intake valves per cylinder are independently phase adjustable; and
    a controller configured to selectively retard the phase of the first intake cam lobes to effect later closing of the first intake valve per cylinder sufficiently to reduce the effective compression ratio of the engine.

8. A dual overhead camshaft internal combustion engine as claimed in claim 7, further comprising:
    an exhaust valve camshaft having respective concentric inner and outer shafts configured for variable phasing therebetween, said exhaust valve camshaft including a first exhaust cam lobe per cylinder configured to actuate a first exhaust valve per cylinder and a second exhaust cam lobe per cylinder configured to actuate a second exhaust valve per cylinder, said first exhaust cam lobes fixedly coupled to said outer shaft, said second exhaust cam lobes fixedly coupled to said inner shaft, whereby the first exhaust valves per cylinder and the second exhaust valves per cylinder are independently phase adjustable; and
    said controller further configured to selectively retard the phase of the first exhaust cam lobes to effect later closing of the first exhaust valve per cylinder sufficiently to increase internal exhaust gas recirculation.

9. A dual overhead camshaft internal combustion engine as claimed in claim 7, further comprising:
    said controller further configured to selectively advance the phase of the second intake cam lobes to effect earlier opening of the second intake valve per cylinder sufficiently to increase internal exhaust gas recirculation.

10. A dual overhead camshaft internal combustion engine as claimed in claim 9, further comprising:
    an exhaust valve camshaft having respective concentric inner and outer shafts configured for variable phasing therebetween, said exhaust valve camshaft including a first exhaust cam lobe per cylinder configured to actuate a first exhaust valve per cylinder and a second exhaust cam lobe per cylinder configured to actuate a second exhaust valve per cylinder, said first exhaust cam lobes fixedly coupled to said outer shaft, said second exhaust cam lobes fixedly coupled to said inner shaft, whereby the first exhaust valves per cylinder and the second exhaust valves per cylinder are independently phase adjustable; and
    said controller further configured to selectively retard the phase of the first exhaust cam lobes to effect later closing of the first exhaust valve per cylinder sufficiently to increase internal exhaust gas recirculation.

11. A dual overhead camshaft internal combustion engine as claimed in claim 7, further comprising:
    a variable lift control device for controlling lift of at least one of the first and second intake valves per cylinder.

12. A dual overhead camshaft internal combustion engine as claimed in claim 8, further comprising:

a variable lift control device for controlling lift of at least one of the first and second intake valves per cylinder.

13. A dual overhead camshaft internal combustion engine as claimed in claim 8, further comprising:
- a first variable lift control device for controlling lift of at least one of the first and second intake valves per cylinder; and
- a second variable lift control device for controlling lift of at least one of the first and second exhaust valves per cylinder.

14. A dual overhead camshaft internal combustion engine as claimed in claim 9, further comprising:
a variable lift control device for controlling lift of at least one of the first and second intake valves per cylinder.

15. A dual overhead camshaft internal combustion engine as claimed in claim 10, further comprising:
- a first variable lift control device for controlling lift of at least one of the first and second intake valves per cylinder; and
- a second variable lift control device for controlling lift of at least one of the first and second exhaust valves per cylinder.

* * * * *